United States Patent
Looman et al.

(10) Patent No.: US 7,297,201 B2
(45) Date of Patent: Nov. 20, 2007

(54) INDELIBLE INK JET INK COMPOSITION

(75) Inventors: Steven D. Looman, Holland, MI (US); John P. Folkers, Palatine, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 140 days.

(21) Appl. No.: 11/030,504

(22) Filed: Jan. 6, 2005

(65) Prior Publication Data

US 2005/0166793 A1    Aug. 4, 2005

Related U.S. Application Data

(60) Provisional application No. 60/534,499, filed on Jan. 6, 2004.

(51) Int. Cl.
    *C09D 11/02*    (2006.01)
(52) U.S. Cl. ............... 106/31.58; 106/31.28; 106/31.86
(58) Field of Classification Search ............ 106/31.58, 106/31.28, 31.86
    See application file for complete search history.

(56) References Cited

U.S. PATENT DOCUMENTS

| | | | |
|---|---|---|---|
| 5,010,125 A | 4/1991 | Kruse et al. | |
| 5,104,448 A | 4/1992 | Kruse | |
| 5,112,398 A | 5/1992 | Kruse | |
| 5,154,761 A | 10/1992 | Cooke et al. | |
| 5,160,535 A | 11/1992 | Cooke et al. | |
| 5,194,475 A | 3/1993 | Kruse et al. | |
| 5,366,543 A * | 11/1994 | Ono et al. | 106/31.41 |
| 5,443,628 A | 8/1995 | Loria et al. | |
| 5,580,372 A * | 12/1996 | Gino et al. | 524/104 |
| 5,663,217 A | 9/1997 | Kruse | |
| 5,674,314 A * | 10/1997 | Auslander et al. | 524/104 |
| 5,744,519 A | 4/1998 | Heraud et al. | |
| 5,443,628 A | 6/1998 | Loria et al. | |
| 5,800,601 A | 9/1998 | Zou et al. | |
| 5,821,963 A | 10/1998 | Sutera et al. | |
| 5,837,046 A | 11/1998 | Schofield et al. | |
| 5,843,219 A | 12/1998 | Griffin et al. | |
| 5,851,274 A * | 12/1998 | Lin | 106/31.43 |
| 6,010,564 A | 1/2000 | Zhu et al. | |
| 6,096,124 A | 8/2000 | Wong et al. | |
| 6,133,342 A | 10/2000 | Mizobuchi et al. | |
| 6,140,391 A | 10/2000 | Zou et al. | |
| 6,179,907 B1 | 1/2001 | Kwan et al. | |
| 6,210,472 B1 | 4/2001 | Kwan et al. | |
| 6,221,933 B1 | 4/2001 | Zhu et al. | |
| 6,231,654 B1 * | 5/2001 | Elwakil | 106/31.47 |
| 6,235,829 B1 | 5/2001 | Kwan | |
| 6,251,175 B1 | 6/2001 | Zhu et al. | |
| 6,261,348 B1 | 7/2001 | Kwan et al. | |
| 6,302,536 B1 | 10/2001 | Sarma et al. | |
| 6,312,113 B1 | 11/2001 | Murad | |
| 6,372,819 B1 | 4/2002 | Mizobuchi et al. | |
| 6,379,440 B1 | 4/2002 | Tatum et al. | |
| 6,391,943 B2 | 5/2002 | Sarma et al. | |
| 6,444,019 B1 * | 9/2002 | Zou et al. | 106/31.4 |
| 6,476,096 B1 | 11/2002 | Molloy et al. | |
| 6,478,861 B1 | 11/2002 | Kwan et al. | |
| 6,603,136 B1 | 8/2003 | Wagner et al. | |
| 6,645,280 B1 | 11/2003 | Zhu et al. | |
| 6,726,756 B1 | 4/2004 | Zou et al. | |
| 2001/0029868 A1 | 10/2001 | Kubota et al. | |
| 2004/0110868 A1 | 6/2004 | Zhu et al. | |
| 2004/0154495 A1 | 8/2004 | Zhu et al. | |
| 2004/0220298 A1 | 11/2004 | Kozee et al. | |
| 2005/0039634 A1 * | 2/2005 | Hermansky | 106/31.59 |

* cited by examiner

*Primary Examiner*—J. A. Lorengo
*Assistant Examiner*—Veronica Faison-Gee
(74) *Attorney, Agent, or Firm*—Leydig, Voit & Mayer, Ltd.

(57) ABSTRACT

Disclosed is an ink jet ink composition that forms indelible images on porous or semiporous substrates. The ink composition comprises a liquid carrier, a first colorant that is soluble in the carrier but insoluble or substantially insoluble in water, and a second colorant composition comprising a pigment, the second colorant composition being dispersible in the carrier. The second colorant composition is insoluble or substantially insoluble in the carrier. The images are difficult or impossible to remove or wash out by the use of aqueous and/or nonaqueous liquids.

28 Claims, No Drawings

INDELIBLE INK JET INK COMPOSITION

CROSS-REFERENCE TO RELATED APPLICATION

This application claims the benefit of U.S. provisional patent application No. 60/534,499, filed Jan. 6, 2004, the disclosure of which is incorporated by reference.

FIELD OF THE INVENTION

This invention pertains to ink jet ink compositions in general, and in particular, to ink jet ink compositions that form indelible images on porous substrates such as paper or paper based substrates, particularly semiporous substrates such as postage stamps. The images are difficult or impossible to remove or wash out by the use of aqueous and/or nonaqueous liquids.

BACKGROUND OF THE INVENTION

To prevent removal of printed images from porous or semiporous substrates, it is desired that the images are indelible. The images printed on porous or semiporous substrates need to resist attempts to remove or wash out the image (mark) by using aqueous or nonaqueous liquids.

An ink that is currently used to print messages contains a "solvent dye," in the vernacular of the Colour Index that is insoluble in water, but soluble in organic solvents. The image printed from this ink on porous or semiporous substrates resists removal by washing in aqueous liquids, but is not resistant to removal if washed with nonaqueous liquids. Indelibility to nonaqueous liquids is needed.

Ink jet printing is well known. Typically, there are two types of ink jet printing systems, the continuous type and the drop-on-demand type. In the continuous ink jet printing system, the droplets of the ink are passed through a charging area wherein individual droplets receive an electrical charge in response to a signal. The droplets are then passed through an electric field, causing a varied deflection of the individual droplets dependent on the intensity of the charge and the field. The droplets are produced continuously, and are directed continuously to the substrate to be printed on or, alternatively, to a bypass gutter. In the drop-on-demand system, the ink droplets are expelled from a printing head only when required during the printing process. Such inks need not be electrically conductive.

Therefore, there exists a need for an ink composition, particularly for use in a drop-on-demand printer, suitable for printing indelible images on porous, particularly semiporous substrates.

The invention provides such an ink composition. The advantages of the invention, as well as additional inventive features, will be apparent from the description of the invention provided herein.

BRIEF SUMMARY OF THE INVENTION

The invention provides an ink jet ink composition that forms indelible images on porous or semiporous substrates. An advantage of the invention is that indelibility has been achieved without sacrificing reliability of the printing operation. The ink composition comprises a liquid (ink) carrier, a first colorant that is soluble in the liquid carrier, and a second colorant composition that is dispersible in the carrier. The second colorant composition contains a pigment and is insoluble or substantially insoluble in the liquid carrier.

The present invention provides an ink jet ink composition comprising a liquid carrier, a first colorant that is soluble in the liquid carrier and insoluble or substantially insoluble in water, and a second colorant composition comprising a pigment that is dispersible in the liquid carrier. In an embodiment, the liquid carrier comprises one or more organic solvents.

Any suitable first colorant and second colorant composition can be used. For example, the first colorant is a solvent dye and the second colorant composition contains a pigment and optionally a dispersant. The present invention further provides a method of ink jet printing indelible images or messages on substrates comprising ejecting from a plurality of orifices a series of droplets of the ink jet ink composition of the invention to a substrate and controlling the timing of the emitted droplets with respect to the movement of the substrate so that the droplets are caused to form the desired printed images or messages, and allowing images or messages to dry.

While the invention has been described with reference to certain embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

The present invention comprises an ink jet ink composition for marking on porous or semiporous substrates such as paper and paper based substrates. A semiporous substrate is a porous substrate coated or printed with a substantial amount of ink so as to reduce, but not eliminate, the porous nature of the substrate. An example of a semiporous substrate is a postage stamp.

The ink jet printed image is rendered indelible to aqueous and nonaqueous liquids by the use, in an embodiment, of a soluble dye and a dispersed pigment in the ink jet ink composition. The ink jet ink composition can be used, for example, for printing cancellation marks on substrates such as postage stamps. The indelibility of the mark is desirable for ensuring that the stamp is used only once. The ink is designed such that it can be printed through an ink jet printer. The preferred ink jet printer to be used with this ink is a drop-on-demand printer. Further, an ink jet printer from which ink is ejected by the motion of piezoelectric actuators is preferred. An example of such a printer is the MARSH ENCORE™ printer.

The components of the ink jet ink composition are a liquid carrier, a first colorant that is soluble in the liquid carrier, and a second colorant composition comprising a pigment, the second colorant composition being dispersible in the liquid carrier but insoluble or substantially insoluble in the liquid carrier. The second colorant composition can contain only a pigment which is dispersible in the liquid carrier, or alternatively, the second colorant composition can include a pigment and a dispersant associated with the pigment to provide dispersibility or dispersion stability. In an embodiment, the ink jet ink composition comprises a first colorant that is soluble in the liquid carrier, a pigment, and a dispersant. The dispersant can be, for example, a surfactant, a polymer, a resin, or combination thereof, which enables dispersion of the pigment in the liquid carrier.

The ink jet ink composition may also contain optional components such as resins, e.g., binder resins, plasticizers, and defoaming agents. Optional components may be used to improve performance of the ink in the printer or on the substrate. Additionally, a chemical component may be added to the ink to prove or determine authenticity of the ink jet ink composition or printed mark (image). The chemical component for determining authenticity may be added in any suitable amount, for example, less than about 1.0%, and typically from about 0.01% to about 0.1% by weight of the ink composition.

Suitable chemical components may have a unique absorbance or emission (e.g., fluorescence or phosphorescence) in the X-ray, UV, visible, or infrared region, or unique molecular mass or fragment mass (as determined by mass spectrometry). An example may be a fluorescent dye or material containing at least one unique element or isotope. An unique element can be a chemical element not contained in any other component of the ink jet ink composition, whether as part of the component or a significant contaminant or by-product in it, but having a unique mass or X-ray fluorescence emission, such as to be detected through mass spectrometry or X-ray fluorescence, respectively. For example, elements that are effective in X-ray fluorescence include transition metals, lanthanide metals, and nontoxic alkali, alkaline earth, or main group elements with atomic numbers greater than or equal to sodium. Examples of such elements include zirconium, copper, and bromine. Unique isotope(s) can be typically low in natural abundance, preferably less than about 2% and should be stable—that is, nonradioactive—so as to give a unique feature in a mass spectrum. Examples of stable isotopes may be deuterium, carbon-13, and oxygen-18. The compounds containing the stable isotopes will be enriched with the isotopes significantly beyond the naturally occurring levels to allow differentiation from background levels during mass spectrometry. See, for example, U.S. Pat. Nos. 6,477,134; 6,477,227; and 6,501,825.

The liquid carrier is nonaqueous -that is, it does not contain significant amounts of added water. If water is present, it would be present preferably in an amount less than about 10%, preferably less than about 5% by weight of the liquid carrier, and more preferably less than about 1% by weight.

The preferred liquid carrier contains one or more glycol or glycol ether solvents, which are liquids in the temperature of from about 20° C. to about 70° C. The liquid carrier can contain any suitable glycol. Examples of glycols include diethylene glycol, triethylene glycol, dipropylene glycol, and tripropylene glycol. Any suitable glycol ether can be used, for example, glycol ethers of ethylene glycol and propylene glycol, such as monoalkyl ethers of ethylene glycol, diethylene glycol, triethylene glycol, propylene glycol, dipropylene glycol, and tripropylene glycol. Examples of glycol ethers include diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether. Any combination of such solvents can also be used, for example, a mixture of a glycol and a glycol ether, such as a mixture of triethylene glycol and tripropylene glycol monomethyl ether, can be used.

The first colorant is soluble in the liquid carrier, but is insoluble or practically or substantially insoluble in water. Any suitable first colorant can be used, for example, a solvent dye, preferably a black solvent dye. A combination of two or more first colorants may be used, for example, to generate a desired color. The primary function of the first colorant is to provide a dark, visible image upon printing. The first colorant can be present in an amount less than about 20%, and preferably less than about 15% by weight of the ink jet ink composition. Examples of first colorant include black, solvent-soluble dyes such as C.I. Solvent Black 3, C.I. Solvent Black 7, C.I. Solvent Black 27, C.I. Solvent Black 29, C.I. Solvent Black 35, and C.I. Solvent Black 48.

The second colorant composition is chosen such that it is insoluble in the liquid carrier, but can be dispersed. An image of the pigment should remain even when the first colorant is removed, for example, if the printed image is washed in a solvent in which the first colorant is soluble. The remaining mark is legible to the naked eye, but need not be dark in color. A combination of two or more second colorant compositions may be used to generate a desired color on the substrate after the first colorant has been removed from the printed images. Carbon black is preferred as a pigment or as part of the second colorant composition. The pigment can have any suitable particle size, e.g., a volume average particle size less than about 1 μm, preferably less than about 0.5 μm, and more preferably less than about 0.3 μm.

The amount of the second colorant composition should be optimized to leave a visible mark remaining after washing with a solvent in which the first colorant is soluble, but have a minimal impact to reliability of the printing system. It is commonly known in the art that pigmented inks typically require more frequent maintenance in drop-on-demand ink jet printers than dye-based inks, because of the insoluble nature of the pigments. To ensure the maximum reliability of the printing system, it is therefore preferred that a minimum amount of the second colorant composition be used in the ink jet ink composition. The ink jet ink composition, accordingly, contains preferably less than about 5% and more preferably less than about 3% of the second colorant composition. The ink jet ink composition, in accordance with an embodiment of the invention, contains preferably less than about 2% and more preferably less than about 1% of the pigment.

The second colorant composition may comprise a combination of colorant and dispersant, to maintain stability of the dispersed pigment particles in the liquid carrier. Thus, the second colorant composition may be a part of a color composition, dispersion, or chip that includes one or more dispersants, whose function is to maintain stable dispersion of the pigment in the liquid carrier. It is commonly known in the art that pigments require dispersing agents in ink jet inks to maintain stability and dispersion. Dispersants are commonly surfactants, polymers, resins, polymeric dispersants, or combinations thereof. Examples of polymeric dispersants include polyurethanes, polyacrylates, and amine-functional polymer/acid condensation polymers. The polymeric dispersant may be an amine functional polymer or copolymer, e.g., a block copolymer. Examples of amine-functional block copolymers include DISPERBYK™-115, DISPERBYK-160, and DISPERBYK-161 from BYK Chemie. Examples of amine functional polymer/acid condensation polymers include SOLSPERSE™ 13940, SOLSPERSE 38500, and SOLSPERSE 32500 from Lubrizol. Choice of appropriate dispersant will be based, among others, on the type of pigment and of liquid carrier. A suitable example of a second colorant composition is contained in 929-39230

Bar Code Black supplied by Gibraltar Chemical Works, which is a dispersion of carbon black with dispersant(s) in tripropylene glycol monomethyl ether (TPM).

Binder resins may additionally impart adhesion of the image to the substrate. Examples of binder resins include polyester resins, polyamides, polyvinylbutyral resins, phenolic resins, aldehyde resins, ketone resins, cellulosic resins, styrene acrylic, rosin esters, and acrylic resins. In addition, the ink jet ink composition may include a plasticizer, a defoamer, an antioxidant, and the like. A surfactant may be used to control the surface energy of the ink, for example, to improve image quality or operation in the printer. Use of this surfactant is separate and unique from the role of surfactant as dispersant.

The ink jet ink composition of the invention can have any suitable viscosity. The viscosity of the ink composition is preferably from about 3 to about 30 centipoise at the operating temperature of the print head, for example, from about 8 to about 15 centipoise at 50° C. The operating temperature of print head will depend on the type of print head chosen and also the system in which it is being used, for example, from about 20° C. to about 70° C. The viscosity can be adjusted by choice and composition of solvents used as part of the liquid carrier, the type of colorants chosen, or the amount of colorant used.

The present invention provides, in an embodiment, an ink jet ink composition wherein the liquid carrier is present in an amount of from about 60% to about 97% by weight, the first colorant is present in an amount of from about 3% to about 20% by weight, and the second colorant composition is present in an amount of from about 0.1% by weight to about 5% by weight of the ink jet ink composition.

The present invention provides, in another embodiment, an ink jet ink composition wherein the liquid carrier is present in an amount of from about 80% to about 95% by weight, the first colorant is present in an amount of from about 5% to about 12% by weight, and the second colorant composition is present in an amount of from about 0.5% by weight to about 3% by weight of the ink jet ink composition.

The ink jet ink composition can be prepared by any suitable method, for example, by combining and mixing the required ingredients, and optionally filtering the ink to remove any undesirable materials.

The ink jet ink composition of the present invention can be used to print images on any suitable substrate, particularly a paper or paper based substrate, for example, postage stamp, Kraft paper, corrugated board, chip board, and documents. The substrates are porous, and particularly semiporous. The porous or semiporous substrates can vary in surface smoothness and/or treatment.

The ink jet ink composition of the invention can print images which are indelible. Indelibility is defined as having a visible mark remaining after washing with or soaking in a solvent for a set duration, for example 24 hours. The images resist removal if washed with one or more aqueous or nonaqueous liquids. Examples of aqueous liquids include solutions of commercially available detergents in water, commercially available cleaning solutions, or solutions of water-miscible organic solvents in water. Examples of nonaqueous liquids include organic solvents, for example, acetone, butanol, chlorobenzene, ethanol, ethyl acetate, isobutanol, methanol, methylene chloride, pyridine, and toluene, and industrial mixtures of organic fluids, for example, DOT3 brake fluid, lighter fluid, and gasoline additives.

The following example further illustrates the invention but, of course, should not be construed as in any way limiting its scope.

EXAMPLE

This example demonstrates ink jet ink compositions in accordance with an embodiment of the present invention. This example also demonstrates an advantage of an embodiment of an ink jet ink composition of the present invention.

TABLE 1

Example Ink Formulations

| Components | Supplier | Control[3] | Formulation 1 | Formulation 2 |
|---|---|---|---|---|
| Glycol Ether TPM | Ashland Distribution Co. | — | 59.31 | 57.37 |
| Triethylene glycol | Ashland Distribution Co. | — | 26.79 | 27.33 |
| Oil Black 860 (Solvent Black 3) | Orient Chemical | — | 11.25 | 10.00 |
| 929-39230 Barcode Black[1] | Gibraltar Chemical Works | 0.00 | 2.65 | 5.30 |
| Total | | — | 100.00 | 100.00 |
| % Second colorant composition in ink[2] | | 0.00 | 1.33 | 2.67 |
| Viscosity at 25° C. (centipoise) | | 26.0 | 25.75 | 25.5 |

[1]The 929-39230 Barcode Black dispersion contains 49.7% Glycol Ether TPM, 30.0% carbon black, and 20.3% proprietary dispersant(s).
[2]This value includes both pigment and dispersant (a second colorant composition).
[3]Series 2000 black ink by Videojet Technologies Inc., containing no pigment.

Samples were generated by printing a code uniformly over the length of a substrate, a postage stamp. Each sample was then allowed to dry overnight. Samples were then cut in half, one half being retained as a control. The other half was completely submerged in a sealed glass vial for 24 hours in the desired solvent with no external agitation or abrasion. Samples were then removed and allowed to air dry. Visual evaluations were then made comparing the exposed and control portions of each stamp.

As shown in Table 2, multiple porous substrates were tested with various organic solvents comparing the control and the improved example ink formulation #1. In many cases there was a significant reduction in the optical density of the control after the test. In every case the comparable code generated by the improved ink was as dark or in most cases darker than that of the control. In the cases where the control code was only very weakly visible, example ink #1 left a readily discernible mark remaining on the substrate. In the three cases where the control code was completely removed, the example ink #1 still remained readily discernible.

In the case of the control, some of the solvents which proved particularly effective at removing the code include acetone, pyridine, and tetrahydrofuran. Each of these solvents resulted in complete removal of the control code on one substrate. In contrast, the improved formulation example ink #1 resulted in readily discernible codes remaining for each of these solvent/substrate combinations.

TABLE 2

Comparison of test results between control and Example Ink #1

| Solvent | Substrate #1 | | Substrate #2 | |
| --- | --- | --- | --- | --- |
| | control | example ink #1 | control | example ink #1 |
| Acetone | D | D | X | P |
| Acetonitrile | D | D | T | P |
| Butanol | T | P | T | P |
| Chloroform | D | D | T | P |
| Ethanol | T | P | T | P |
| Ethyl Acetate | D | D | T | P |
| Isopropanol | T | P | P | P |
| Methanol | T | P | T | P |
| Pyridine | D | D | X | P |
| Tetrahydrofuran | D | D | X | P |

"P" = Pass (code may be reduced in optical density, but is still readily visually discernible)
"T" = Trace image of the code is still discernible (code not readily discernible)
"X" = Failure (code completely removed)
"D" = Substrate defaced by solvent (code performance not established due to other damage)

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An ink jet ink composition comprising a liquid carrier, a first colorant that is soluble in the liquid carrier but insoluble or substantially insoluble in water, and a second colorant composition comprising a pigment, said second colorant composition being dispersible but insoluble or substantially insoluble in the liquid carrier, wherein the liquid carrier includes one or more glycols and one or more glycol ethers selected from the group consisting of diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether.

2. The ink jet ink composition of claim 1, wherein the glycols are selected from the group consisting of diethylene glycol, triethylene glycol, dipropylene glycol, and tripropylene glycol, and any combination thereof.

3. The ink jet ink composition of claim 1, wherein the liquid carrier includes a mixture of triethylene glycol and tripropylene glycol monomethyl ether.

4. The ink jet ink composition of claim 1, wherein the first colorant is present in an amount less than 20% by weight of the ink jet ink composition.

5. The ink jet ink composition of claim 4, wherein the first colorant is present in an amount less than 15% by weight of the ink jet ink composition.

6. The ink jet ink composition of claim 1, wherein the first colorant is a solvent dye.

7. The ink jet ink composition of claim 6, wherein the solvent dye is a black dye.

8. The ink jet ink composition of claim 7, wherein the black dye is selected from the group consisting of C.I. Solvent Black 3, C.I. Solvent Black 7, C.I. Solvent Black 27, C.I. Solvent Black 29, C.I. Solvent Black 35, and C.I. Solvent Black 48, and any combination thereof.

9. The ink jet ink composition of claim 1, wherein the second colorant composition is a pigment.

10. The ink jet ink composition of claim 1, wherein the pigment is carbon black.

11. The ink jet ink composition of claim 1, wherein the second colorant composition includes a dispersant.

12. The ink jet ink composition of claim 11, wherein the dispersant comprises at least one of a surfactant, a polymer, a polymeric dispersant, and a resin.

13. The ink jet ink composition of claim 1, wherein the second colorant composition is present in an amount less than about 5% by weight of the ink jet ink composition.

14. The ink jet ink composition of claim 13, wherein the second colorant composition is present in an amount less than about 3% by weight of the ink jet ink composition.

15. The ink jet ink composition of claim 1, wherein the pigment is present in an amount less than about 2% by weight of the ink jet ink composition.

16. The ink jet ink composition of claim 15, wherein the pigment is present in an amount less than about 1% by weight of the ink jet ink composition.

17. The ink jet ink composition of claim 1, further including one more additives selected from the group consisting of binder resins, plasticizers, surfactants, defoaming agents, and chemical components for determining authenticity.

18. The ink jet ink composition of claim 17, wherein the chemical component for determining authenticity is a fluorescent dye.

19. The ink jet ink composition of claim 1, wherein the liquid carrier is present in an amount of from about 60% to about 97% by weight, the first colorant is present in an amount of from about 3% to about 20% by weight, and the second colorant composition is present in an amount of from about 0.1% by weight to about 5% by weight of the ink jet ink composition.

20. The ink jet ink composition of claim 19, wherein the liquid carrier is present in an amount of from about 80% to about 95% by weight, the first colorant is present in an amount of from about 5% to about 12% by weight, and the second colorant composition is present in an amount of from about 0.5% by weight to about 3% by weight of the ink jet ink composition.

21. A method for printing ink jet ink images on a substrate comprising ejecting from a plurality of orifices a series of droplets of the ink jet ink composition of claim 1 to the substrate, controlling the timing of the emitted droplets with respect to the movement of the substrate so that the droplets form an image on the substrate, and allowing the images to dry.

22. The method of claim 21, wherein the plurality of orifices is disposed in a drop-on-demand ink jet printer.

23. The method of claim 22, wherein the ink jet printer uses a motion of a piezoelectric actuators to eject the droplets.

24. The method of claim 21, wherein the substrate is a porous substrate.

25. The method of claim 24, wherein the porous substrate is paper or paper based substrate.

26. The method of claim 21, wherein the substrate is a semiporous substrate.

27. The method of claim 26, wherein the semiporous substrate is a postage stamp.

28. The method of claim 21, wherein the image resists removal if washed with an aqueous or nonaqueous liquid.

* * * * *